United States Patent

Bakula

Patent Number: 6,000,556
Date of Patent: Dec. 14, 1999

[54] SCREEN ASSEMBLY FOR VIBRATORY SCREENING MACHINE

[75] Inventor: John J. Bakula, Grand Island, N.Y.

[73] Assignee: Derrick Manufacturing Corporation, Buffalo, N.Y.

[21] Appl. No.: 09/038,546

[22] Filed: Mar. 11, 1998

Related U.S. Application Data

[63] Continuation-in-part of application No. 08/443,377, May 17, 1995, Pat. No. 5,783,077, which is a continuation of application No. 08/273,217, Jul. 11, 1994, Pat. No. 5,417,859, which is a continuation-in-part of application No. 08/127,800, Sep. 28, 1993, abandoned, which is a continuation-in-part of application No. 08/062,464, May 14, 1993, Pat. No. 5,417,858, which is a continuation-in-part of application No. 08/004,122, Jan. 13, 1993, abandoned.

[51] Int. Cl.$^6$ .............................. B01D 33/03; B07B 1/46; B07B 1/49

[52] U.S. Cl. .................. 210/388; 210/493.1; 210/493.2; 210/493.3; 210/489; 210/490; 210/498; 210/499; 210/389; 209/397; 209/399; 209/401; 209/403; 209/329

[58] Field of Search ................................. 210/388, 493.1, 210/493.2, 493.3, 489, 490, 498, 499, 389; 209/397, 398, 399, 401, 402, 403, 329, 330

[56] References Cited

U.S. PATENT DOCUMENTS

| | | |
|---|---|---|
| 40,242 | 10/1863 | Capell . |
| 246,144 | 8/1881 | Keeler . |
| 275,340 | 4/1883 | Kimball . |
| 500,302 | 6/1893 | Stoeckel et al. . |
| 526,562 | 9/1894 | Cross . |
| 560,858 | 5/1896 | Missroon . |
| 607,598 | 7/1898 | Closz . |
| 691,045 | 1/1902 | Climenson et al. . |
| 800,693 | 10/1905 | Traylor . |
| 964,144 | 7/1910 | Chavanne et al. . |
| 964,897 | 7/1910 | Bryant . |
| 966,578 | 8/1910 | Murphy et al. . |
| 984,866 | 2/1911 | Tate . |
| 1,009,069 | 11/1911 | Hunnicutt . |
| 1,098,979 | 6/1914 | Schuchard . |
| 1,132,667 | 3/1915 | Milliot . |
| 1,269,085 | 6/1918 | Jeske . |
| 1,423,021 | 7/1922 | Reynolds . |
| 1,462,804 | 7/1923 | Evans . |
| 1,561,632 | 11/1925 | Woodward . |
| 1,947,307 | 2/1934 | Rafton . |
| 1,997,713 | 4/1935 | Boehm . |

(List continued on next page.)

FOREIGN PATENT DOCUMENTS

| | | |
|---|---|---|
| 505776 | 9/1951 | Belgium . |
| 599661 | 6/1960 | Canada . |
| 453348 | 10/1991 | European Pat. Off. . |
| 3818972 | 2/1990 | Germany . |
| 55-32404 | 8/1980 | Japan . |
| 59-142818 | 8/1984 | Japan . |
| 1-203010 | 8/1989 | Japan . |
| 457924 | 12/1936 | United Kingdom . |
| 519680 | 4/1940 | United Kingdom . |
| 743902 | 1/1956 | United Kingdom . |
| 823648 | 11/1959 | United Kingdom . |
| 1106513 | 3/1968 | United Kingdom . |
| 1225849 | 3/1971 | United Kingdom . |
| 1512958 | 6/1978 | United Kingdom . |
| 2124099 | 2/1984 | United Kingdom . |
| 89/10781 | 11/1989 | WIPO . |

*Primary Examiner*—Thomas M. Lithgow
*Attorney, Agent, or Firm*—Joseph P. Gastel

[57] ABSTRACT

A screening screen assembly for a vibratory screening machine including an apertured plate having side edge portions with first apertured bands extending between the side edge portions and second unapertured bands alternating with the first bands, the second bands having a wider width than the borders between the apertures in the first band, and an undulating screening screen having ridges and troughs between the ridges extending crosswise to the first and second plate bands and being secured thereto.

21 Claims, 2 Drawing Sheets

6,000,556
Page 2

U.S. PATENT DOCUMENTS

| | | |
|---|---|---|
| 1,997,740 | 4/1935 | Nickerson . |
| 2,038,071 | 4/1936 | Wilhelm . |
| 2,082,513 | 6/1937 | Roberts . |
| 2,089,548 | 8/1937 | Frantz . |
| 2,274,700 | 3/1942 | Jenks . |
| 2,315,055 | 3/1943 | Heller . |
| 2,406,051 | 8/1946 | Weiss . |
| 2,462,878 | 3/1949 | Logue . |
| 2,648,441 | 8/1953 | Soldan . |
| 2,723,032 | 11/1955 | Gisler . |
| 2,726,184 | 12/1955 | Cox . |
| 2,929,464 | 3/1960 | Sprouse . |
| 2,957,235 | 10/1960 | Steinberg . |
| 2,980,208 | 4/1961 | Neumann . |
| 3,057,481 | 10/1962 | Pall . |
| 3,165,473 | 1/1965 | Pall . |
| 3,255,885 | 6/1966 | Burls . |
| 3,306,794 | 2/1967 | Humbert, Jr. . |
| 3,374,886 | 3/1968 | Lightsey . |
| 3,465,413 | 9/1969 | Rosaen et al. . |
| 3,664,503 | 5/1972 | Felden . |
| 3,679,057 | 7/1972 | Perez . |
| 3,747,772 | 7/1973 | Brown . |
| 3,853,529 | 12/1974 | Boothe et al. . |
| 3,970,549 | 7/1976 | Ennis et al. . |
| 4,019,987 | 4/1977 | Krasnow . |
| 4,022,596 | 5/1977 | Pedersen . |
| 4,033,865 | 7/1977 | Derrick . |
| 4,064,051 | 12/1977 | Wehner . |
| 4,075,106 | 2/1978 | Yamazaki . |
| 4,380,494 | 4/1983 | Wilson . |
| 4,464,263 | 8/1984 | Brownell . |
| 4,512,892 | 4/1985 | Ganzi . |
| 4,517,090 | 5/1985 | Kersten . |
| 4,575,421 | 3/1986 | Derrick et al. . |
| 4,582,597 | 4/1986 | Huber . |
| 4,594,162 | 6/1986 | Berger . |
| 4,617,122 | 10/1986 | Kruse . |
| 4,647,373 | 3/1987 | Tokar et al. . |
| 4,696,751 | 9/1987 | Eifling . |
| 4,701,197 | 10/1987 | Thornton . |
| 4,746,339 | 5/1988 | Millard . |
| 4,758,333 | 7/1988 | Masica et al. . |
| 4,820,407 | 4/1989 | Lilie . |
| 4,832,834 | 5/1989 | Baird, Jr. . |
| 4,882,054 | 11/1989 | Derrick . |
| 4,940,500 | 7/1990 | Tadokoro et al. . |
| 4,954,249 | 9/1990 | Gero . |
| 5,084,178 | 1/1992 | Miller . |
| 5,139,154 | 8/1992 | Gero . |
| 5,167,740 | 12/1992 | Michaelis . |
| 5,221,008 | 6/1993 | Derrick, Jr. et al. . |
| 5,230,455 | 7/1993 | Price . |
| 5,312,508 | 5/1994 | Chisholm . |
| 5,417,793 | 5/1995 | Bakula . |
| 5,417,858 | 5/1995 | Derrick . |
| 5,417,859 | 5/1995 | Bakula . |
| 5,490,598 | 2/1996 | Adams . |
| 5,598,930 | 2/1997 | Leone et al. . |
| 5,636,749 | 6/1997 | Wojciechowski . |
| 5,720,881 | 2/1998 | Derrick . |
| 5,783,077 | 7/1998 | Bakula . |

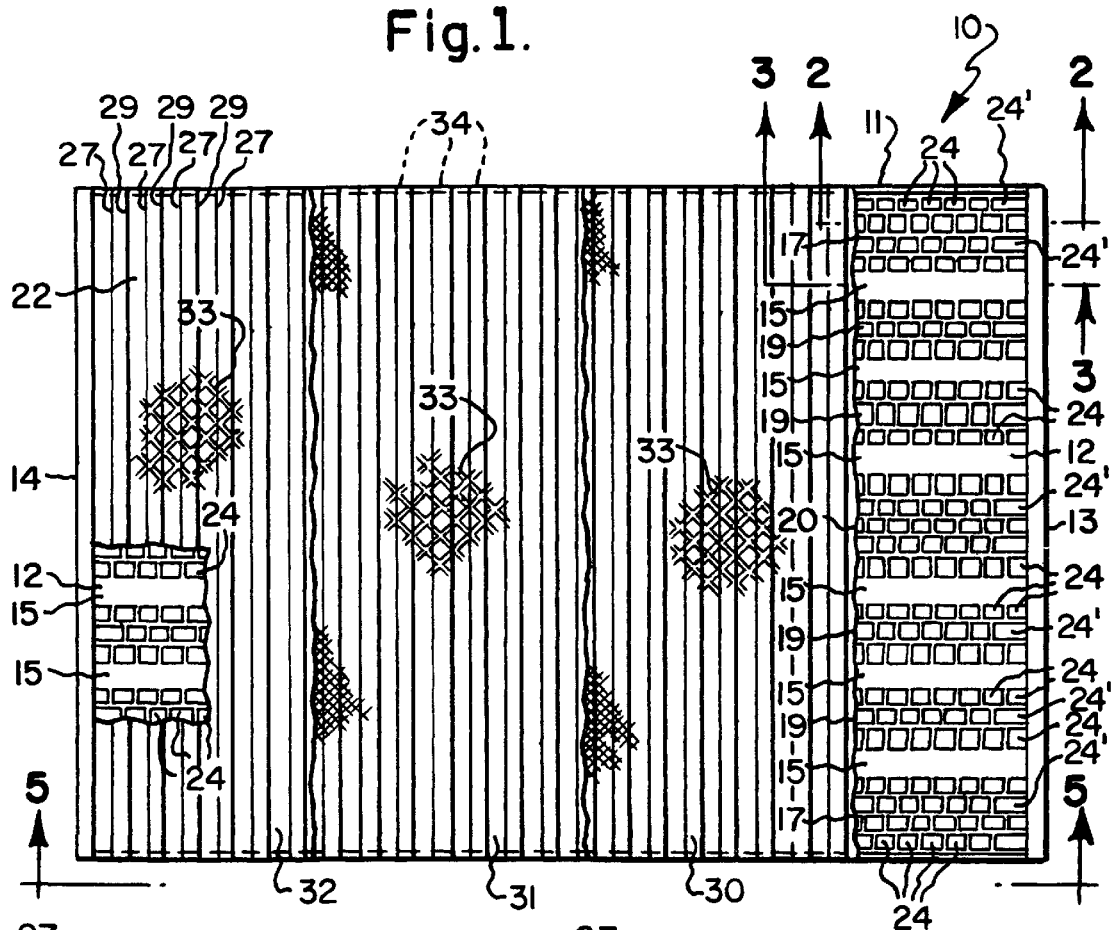
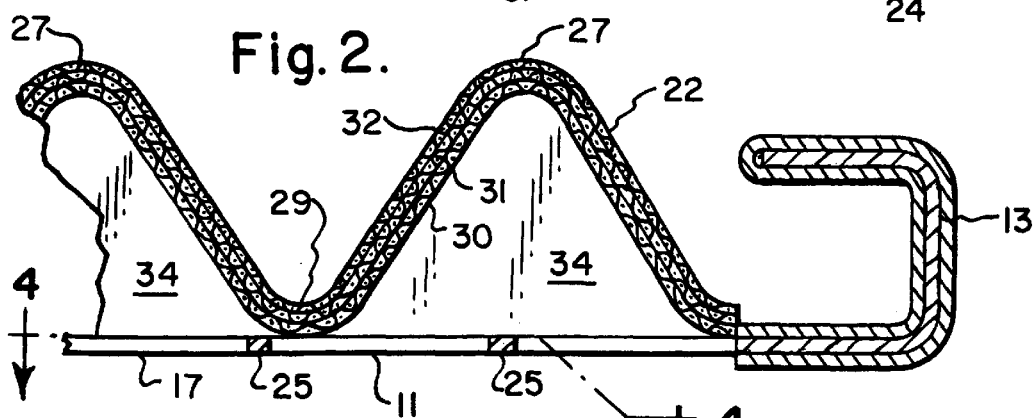
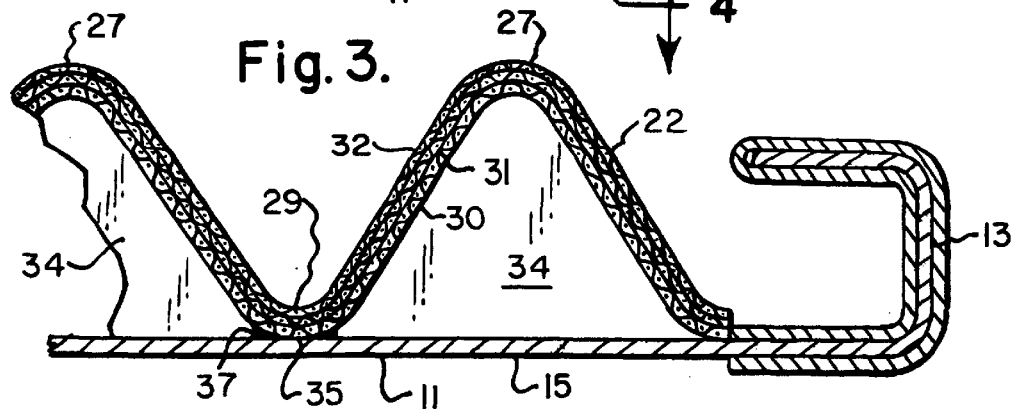

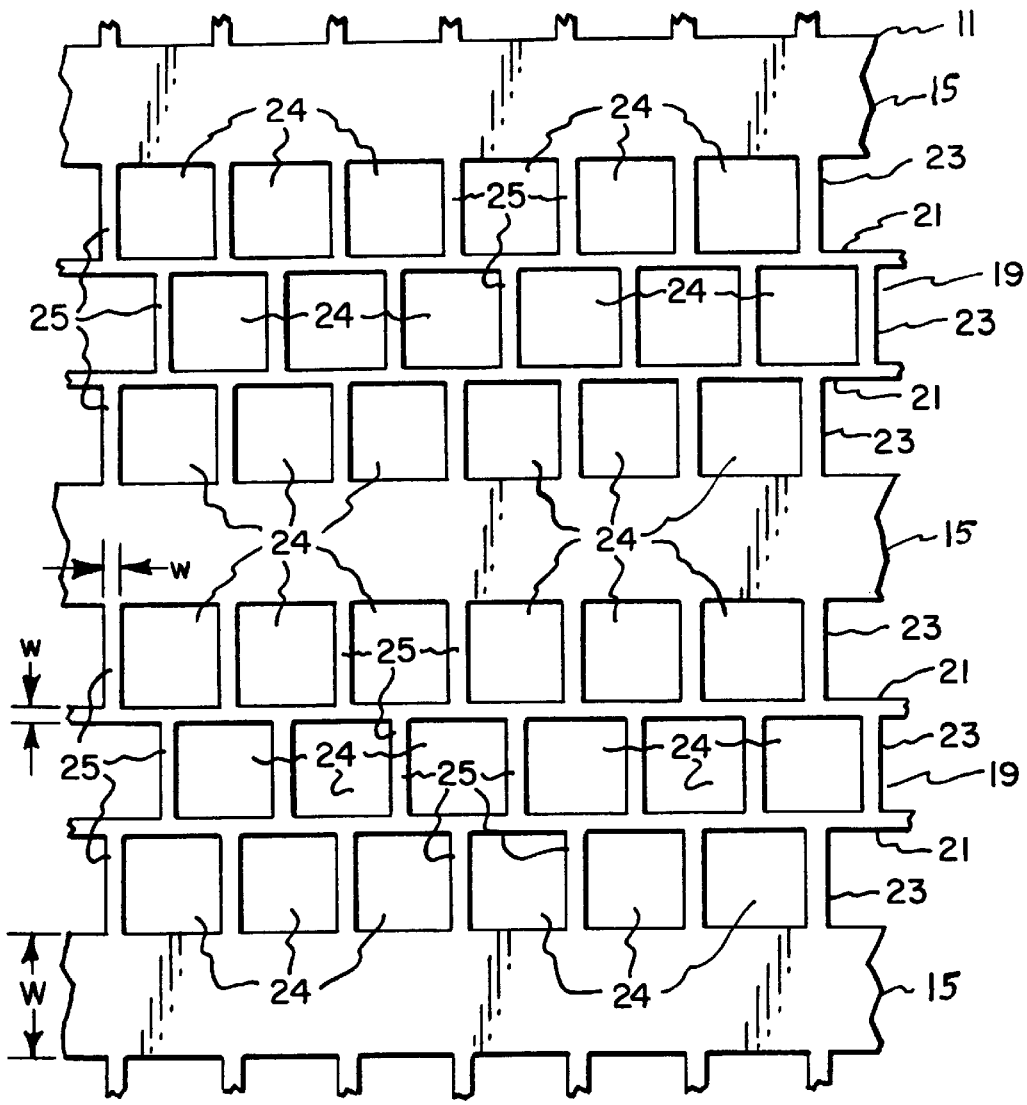
Fig. 4.
Fig. 5.
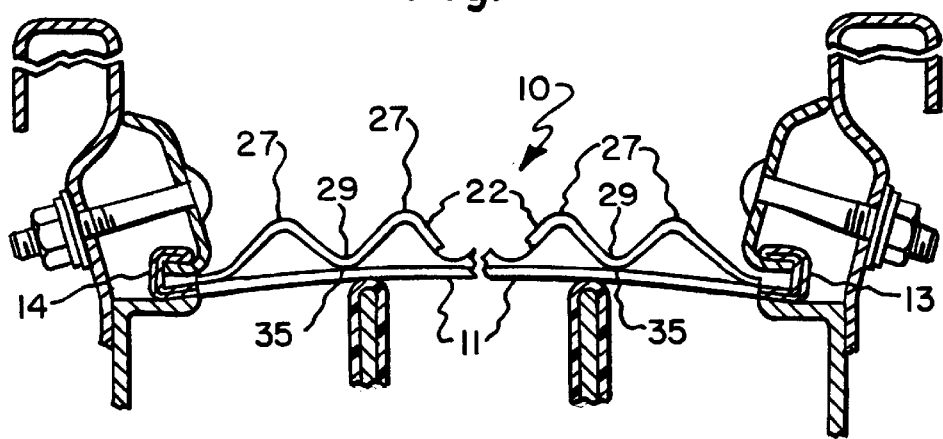

SCREEN ASSEMBLY FOR VIBRATORY SCREENING MACHINE

CROSS-REFERENCE TO RELATED APPLICATIONS

The present invention is a continuation-in-part of application Ser. No. 08/443,377, filed May 17, 1995 which is a continuation of application Ser. No. 08/273,217, filed Jul. 11, 1994, now U.S. Pat. No. 5,417,859, issued May 23, 1995, which is a continuation-in-part of Ser. No. 08/127, 800, filed Sep. 28, 1993, now abandoned, which is a continuation-in-part of application Ser. No. 08/062,464, filed May 14, 1993, now U.S. Pat. No. 5,417,858, issued May 23, 1995, which is a continuation-in-part of application Ser. No. 08/004,122, filed Jan. 13, 1993, now abandoned.

STATEMENT REGARDING FEDERALLY SPONSORED RESEARCH OR DEVELOPMENT

Not Applicable

BACKGROUND OF THE INVENTION

The present invention relates to an improved screening screen assembly for a vibratory screening machine.

Undulating screening screen subassemblies adhesively bonded to apertured plates are shown in U.S. Pat. Nos. 5,417,859, 5,417,853 and 5,417,793. The plates such as shown in these patents have apertures bounded by relatively narrow plate members or strips, each of which provides a very limited area of adhesive securement or bonding to the undersides of troughs of undulating screens. While the foregoing adhesive securement to relatively narrow frame members is satisfactory for most environments, if it is utilized in corrosive environments, the adhesive bond between the undersides of the troughs and the narrow strips of the plate could be eroded because of the relatively small areas of adhesive contact therebetween. In the past there have also been in use plates or frames which comprised elongated relatively wide strips between the side edges of the plates or frames, with elongated openings or apertures between the strips, and such elongated openings extended substantially the entire length between the side edges. However, in screening screen assemblies of this type, there was no support for the elongated strips between their ends because of the fact that the openings between the strips extended substantially the entire distance between the side edges. Thus the elongated strips were essentially adhesively bonded to each other by the undulating screen, and when the screening screen assemblies were handled, the elongated plate strips could flex relative to each other with the attendant possibility that the bond between the undulating screen subassembly and the elongated strips could be broken.

BRIEF SUMMARY OF THE INVENTION

It is accordingly one object of the present invention to provide an improved screening screen assembly wherein an undulating screen is bonded to a plate in a manner in which the bond therebetween cannot be easily eroded in corrosive environments and wherein the plate and screen are bonded together in an extremely physical stable manner wherein spaced relatively wide bands which are secured to the side edges of the plate are secured to each other by other portions of the plate so that they cannot flex appreciably relative to each other.

Another object of the present invention is to provide an improved screening screen assembly for a vibratory screening machine which not only achieves the foregoing object but also has a relatively large open area in the supporting plate. Other objects and attendant advantages of the present invention will readily be perceived hereafter.

The present invention relates to a screening screen assembly for a vibratory screening machine comprising a plate, side edge portions on said plate, a plurality of first and second alternating plate bands extending between said side edge portions, a plurality of apertures in said first plate bands, said first plate bands being wider than said second plate bands, an undulating screening screen having ridges and troughs between said ridges for conducting material to be screened longitudinally thereof, said ridges and troughs extending crosswise to said first and second plate bands, and said undulating screening being secured to said second plate bands.

The present invention also relates to a screening screen assembly for a vibratory screening machine comprising a plate, side edge portions on said plate, a plurality of first plate bands extending crosswise between said side edge portions, a plurality of apertures in said first plate bands, plate members having a first width between said apertures in said first plate bands, a plurality of second plate bands extending crosswise between said side edge portions, said second plate bands having a second width which is larger than said first width, an undulating screening screen having ridges and troughs between said ridges for conducting material to be screened longitudinally thereof, said ridges and troughs extending crosswise to said first and second plate bands, and said undulating screen being secured to said second plate bands.

The various aspects of the present invention will be more fully understood when the following portions of the specification are read in conjunction with the accompanying drawings wherein:

BRIEF DESCRIPTION OF THE SEVERAL VIEWS OF THE DRAWING

FIG. 1 is a plan view of the improved screen assembly of the present invention with portions broken away to show the various layers thereof;

FIG. 2 is a fragmentary enlarged cross sectional view taken substantially along line 2—2 of FIG. 1 and showing the band of the plate which contains apertures;

FIG. 3 is an enlarged fragmentary cross sectional view taken substantially along line 3—3 of FIG. 1 and showing the band of the plate which does not contain apertures;

FIG. 4 is a fragmentary enlarged plan view of a portion of the plate of the screen assembly; and FIG. 5 is a fragmentary end elevational view, partially in cross section taken substantially in the direction of arrows 5—5 of FIG. 1 and showing, in addition to the screen assembly, portions of a vibratory screening machine which supports the screen assembly.

DETAILED DESCRIPTION OF THE INVENTION

The improved screen assembly 10 of the present invention includes a plate 11 having side edge portions 12 which merge into channels 13 and 14 which are mirror images of each other. A plurality of bands 15, 17, 19 and 20 extend between side portions 12, and bands 15 alternate with apertured bands 17, 19 and 20. The only difference between bands 17, 19 and 20 is their width. More specifically, bands 17 have four rows of apertures and bands 19 have three rows of apertures and band 20 has five rows of apertures. The number of rows of apertures in any particular band is optional. Thus, for example all of the apertured bands may have equal numbers of rows of apertures. The primary consideration is that the rows of apertures should be separated by bands such as 15 which are wider than the plate members such as 21 (FIG. 4) which separate the rows of apertures in bands 17, 19 and 20 so as to provide a wide base to which the undulating screen 22 is bonded by a suitable epoxy.

The size of the bonded area in each band 15 enhances resistance against erosion of the epoxy bond, especially when the screen assembly 10 is used with corrosive materials. In its more specific aspects, each band 19 includes three rows 23 of apertures 24. As noted above, each row of apertures 24 is separated by a horizontal plate member 21, and plate members 25 extend transversely to plate members 21 and separate the adjacent apertures 24 of each row. The plate members 25 of each outermost row of apertures of each apertured band merge into the unapertured bands 15. As can be seen from FIG. 4, the plate members 25 of each row are staggered relative to the plate members 25 of an adjacent row of apertures 24. At this point it is to be noted that the width W of band 15 is wider than the width w of plate members 21 and 25. The significance of the foregoing is that the bands 15 provide a relatively large area to which the underside of each trough of the undulating screen 22 is bonded, while the relatively narrow dimension of each of the plate members 21 and 25 permits a relatively large amount of open area in each of bands 17, 19 and 20. At this point it is to be noted that while only apertures 24 have been shown in bands 19 in FIG. 4, the apertures in bands 17 and 20 are of the same size and thus it will be designated by the same numerals in FIG. 1. It is to be noted from row 17 (FIG. 1) that there are end apertures 24' which are of a larger size than apertures 24. This permits the staggering of plate members 25 to produce the construction shown in FIG. 4. Rows 15 and 20 also have larger apertures 24' at their ends.

In a preferred configuration, apertures 24 are 0.75 inches square and plate members 21 are approximately 0.15 inches wide and plate members 25 are approximately 0.15 inches wide. Apertures 24' are approximately 1 ½ times as wide as apertures 24. Bands 15 are approximately one inch wide. Bands 19 are approximately 2.5 inches wide and bands 17 are approximately 3.4 inches wide and band 20 is approximately 4.25 inches wide. The steel plate 11 is approximately 41 inches long and approximately 27 inches wide and approximately 1/16 of an inch thick.

The undulating screen 22 in this instance consists of three screens 30, 31 and 32 which are bonded together by a perforated plastic grid 33 which has been fused into the screens by suitable heat and pressure. Screen 30 is a coarse screen. A fine screening screen 31 is bonded to coarse screen 30 and a finer screening screen 32 is bonded to screen 31. The undulating screen 22 may be of the type which is fully described from column 4, line 43, to column 5, line 2, of U.S. Pat. No. 5,417,859 which is incorporated herein by reference, thereby obviating the necessity to describe screen 22 in detail. The open ends of the ridges 27 are sealed or blocked by polyurethane caps 34 as fully described in column 8, lines 8–27, of U.S. Pat. No. 5,417,859 which is incorporated herein by reference. The fused plastic which bonds screens 30, 31 and 32 may be of any suitable configuration as shown in, but not limited to, FIGS. 7, 14, 15, 16, 17, 18, 23, 24, 25 and 28 of U.S. Pat. No. 5,417,859 which are incorporated herein by reference along with the text of this patent relating thereto as set forth in column 8, lines 28–41 and column 9, lines 51 through column 10, line 55 and column 11, line 12 through line 22. The undulating screen subassembly 22 can be formed in the manner shown in FIGS. 9 and 9A of U.S. Pat. No. 5,417,859 as described from column 5, line 66 through column 6, line 54, which is incorporated herein by reference.

It will also be appreciated that the specific undulating screen structure 22 need not be limited to the construction described above, but any undulating screen may be used whether it is constructed of three screens 30, 31 and 32 as described above, or constructed of a double screen or of any other number of screens such as the screens shown in FIGS. 21 and 22 of U.S. Pat. No. 5,417,859 which is incorporated herein by reference along with the description of these figures as set forth in column 9, lines 5 through 50.

In fact any type of undulating screen which will serve a specific screening function may be applied to the improved plate or frame 11 in view of the fact that the present invention does not reside in the structure of the undulating screen per se but in its relationship to the improved plate 11 having relatively wide bands 15. In this respect, the undersides 34 of troughs 29 are secured or bonded to plate 11 by epoxy in a manner fully described in U.S. Pat. No. 5,417,859 from column 7, line 56 through column 8, line 7, which is incorporated herein by reference.

In the past a plate or frame which has been used to support an undulating screen subassembly is shown in U.S. Pat. No. 5,417,859. In this type of plate the apertures were distributed generally uniformly throughout the plate and the plate members between the apertures were approximately 1/10th of an inch wide, as set forth in column 4, line 15, of this patent. However, in accordance with the present invention, bands 15 are relatively wide as compared to plate members or strips 21 and 25. Thus, each band 15 provides a relatively wide area underlying the undersides 35 of a undulating screen 22 to thereby provide greater areas of adhesion with the epoxy bonding agent 37 which secures such undersides 35 to the plate. It will be appreciated of course that the undersides 35 also cross plate members or strips 21 and in certain instances will also contact plate members or strips 25 where there will also be a securement by bonding with the epoxy which has been applied to the entire plate 11. However, the major securement areas will be at bands 15.

While preferred embodiments of the present invention have been disclosed, it will be appreciated that it is not limited thereto but may be otherwise embodied within the scope of the following claims.

What is claimed is:

1. A screening screen assembly for a vibratory screening machine comprising a plate, side edge portions on said plate, a plurality of first plate bands extending crosswise between said side edge portions, a plurality of apertures in said first plate bands, plate members having a first width between said apertures in said first plate bands, a plurality of second plate bands extending crosswise between said side edge portions, said second plate bands having a second width which is larger than said first width, an undulating screening screen having ridges and troughs between said ridges for conducting material to be screened longitudinally thereof, said ridges and troughs extending crosswise to said first and second plate bands, and said troughs of said undulating screen being secured to unapertured portions of said second plate bands which are wider than said first width of said plate members.

2. A screening screen assembly as set forth in claim 1 wherein said apertures extend both lengthwise and crosswise of said first plate bands.

3. A screening screen assembly as set forth in claim 2 wherein said plate members comprise plate members which extend lengthwise of said first plate bands.

4. A screening screen assembly as set forth in claim 2 wherein said plate members include first plate members which extend lengthwise of said first plate bands and second plate members which extend crosswise of said first plate bands.

5. A screening screen assembly as set forth in claim 1 wherein said undulating screen is also secured to said plate members.

6. A screening screen assembly as set forth in claim 5 wherein said apertures extend both lengthwise and crosswise of said first plate bands.

7. A screening screen assembly as set forth in claim 6 wherein said plate members comprise plate members which extend lengthwise of said first plate bands.

8. A screening screen assembly as set forth in claim 6 wherein said plate members include first plate members which extend lengthwise of said first plate bands and second plate members which extend crosswise of said first plate bands.

9. A screening screen assembly as set forth in claim 1 wherein said plate members comprise plate members which extend lengthwise of said first bands.

10. A screening screen assembly as set forth in claim 9 wherein said undulating screen is also secured to said plate members.

11. A screening screen assembly as set forth in claim 1 wherein a plurality of said first plate bands alternate with a plurality of said second plate bands.

12. A screening screen assembly as set forth in claim 11 wherein said apertures extend both lengthwise and crosswise of said first plate bands.

13. A screening screen assembly as set forth in claim 12 wherein said plate members comprise plate members which extend lengthwise of said first plate bands.

14. A screening screen assembly as set forth in claim 12 wherein said plate members include first plate members which extend lengthwise of said first plate bands and second plate members which extend crosswise of said first plate bands.

15. A screening screen assembly as set forth in claim 11 wherein said undulating screen is also secured to said plate members.

16. A screening screen assembly as set forth in claim 15 wherein said apertures extend both lengthwise and crosswise of said first plate bands.

17. A screening screen assembly as set forth in claim 16 wherein said plate members comprise plate members which extend lengthwise of said first plate bands.

18. A screening screen assembly as set forth in claim 16 wherein said plate members include first plate members which extend lengthwise of said first plate bands and second plate members which extend crosswise of said first plate bands.

19. A screening screen assembly for a vibratory screening machine comprising a plate, side edge portions on said plate, a plurality of first plate bands extending crosswise between said side edge portions, a plurality of apertures in said first plate bands, plate members having a first width between said apertures in said first plate bands, a plurality of second plate bands extending crosswise between said side edge portions, said second plate bands having a second width which is larger than said first width, an undulating screening screen having ridges and troughs between said ridges for conducting material to be screened longitudinally thereof, said ridges and troughs extending crosswise to said first and second plate bands, and said trough of said undulating screen being secured to unapertured portions of said second plate bands which are wider than said first width of said plate members.

20. A screening screen assembly as set forth in claim 19 wherein said plate members extend crosswise between said side edge portions.

21. A screening screen assembly as set forth in claim 19 wherein said plate members comprise first plate members which extend crosswise between said side edge portions and second plate members which extend transversely to said first plate members.

* * * * *

UNITED STATES PATENT AND TRADEMARK OFFICE
CERTIFICATE OF CORRECTION

PATENT NO.    : 6,000,556
DATED         : December 14, 1999
INVENTOR(S)   : John J. Bakula It is certified that error appears in the above-identified patent and that said Letters Patent is hereby corrected as shown below:

Column 6, line 28 (claim 19), change "trough" to --troughs--.

Signed and Sealed this

Twenty-ninth Day of August, 2000

Attest:

Q. TODD DICKINSON

Attesting Officer

Director of Patents and Trademarks